United States Patent [19]
Boyle et al.

[11] 4,121,644
[45] Oct. 24, 1978

[54] TIRE REMOVAL TOOL
[76] Inventors: Elbert I. Boyle, Rte. 1, Ripley, Okla. 74062; John H. Robertson, P.O. Box 1256, Cushing, Okla. 74023
[21] Appl. No.: 668,850
[22] Filed: Mar. 22, 1976
[51] Int. Cl.² .......................................... B60C 25/06
[52] U.S. Cl. ................................................. 157/1.17
[58] Field of Search ...................... 157/1.17, 1.26, 1.28

[56] References Cited
U.S. PATENT DOCUMENTS

| | | | |
|---|---|---|---|
| 2,602,494 | 7/1952 | Larson | 157/1.17 |
| 2,798,540 | 7/1957 | Branick | 157/1.26 |
| 3,142,330 | 7/1964 | Nelson | 157/1.17 |
| 3,160,196 | 12/1964 | Ohlsen et al. | 157/1.17 |
| 3,362,453 | 1/1968 | Nester | 157/1.17 |
| 3,857,431 | 12/1974 | Boyle | 157/1.26 |

Primary Examiner—James L. Jones, Jr.
Assistant Examiner—James G. Smith
Attorney, Agent, or Firm—William R. Laney

[57] ABSTRACT

A tire removal tool including a base frame, an elongated lever arm spaced from the base frame, and articulated fulcrum post structure pivotally supporting the lever arm on the base frame and a tire bead engaging plate carried on one end of the fulcrum arm. A hydraulic jack is pivotally supported on the base frame beneath the opposite end of the lever arm from that which carries the bead engaging plate, and is mounted for transverse sliding movement on the base frame in a direction normal to the longitudinal axis of the lever arm. A tire positioning slide assembly is slidably mounted on the base frame for sliding movement in a direction extending parallel to the longitudinal axis of the lever arm.

14 Claims, 8 Drawing Figures

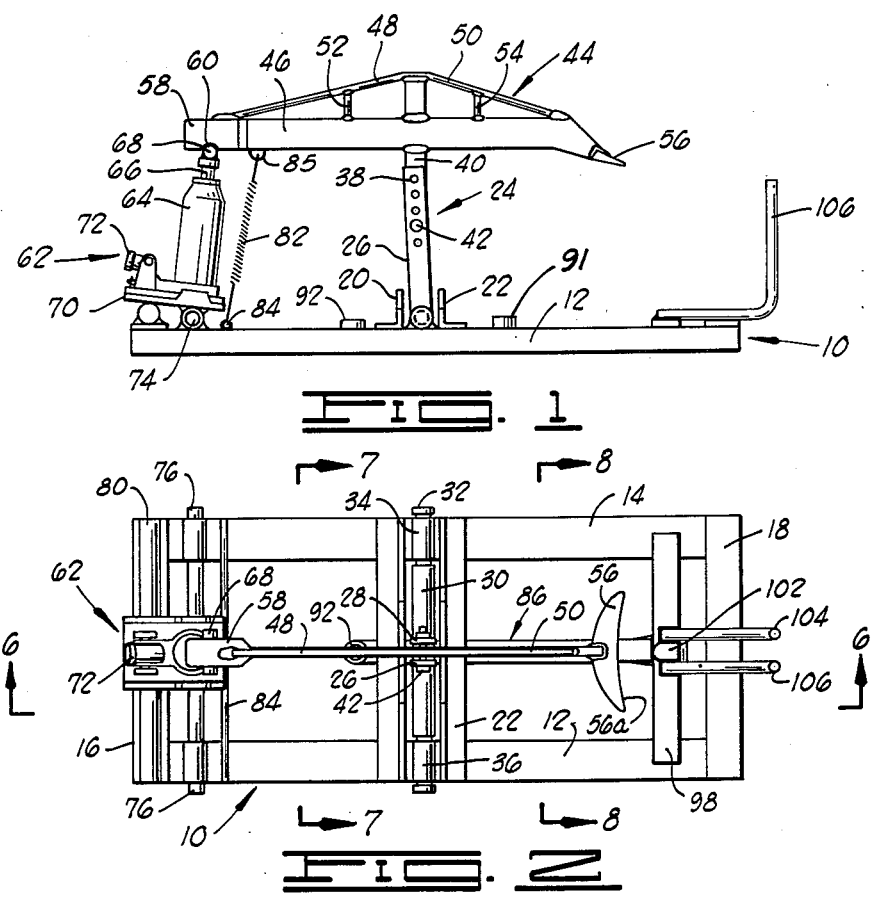
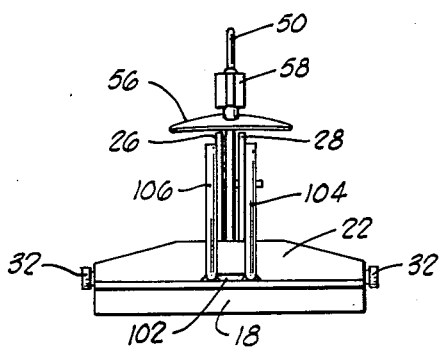
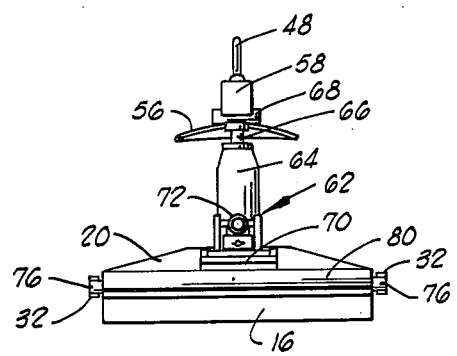

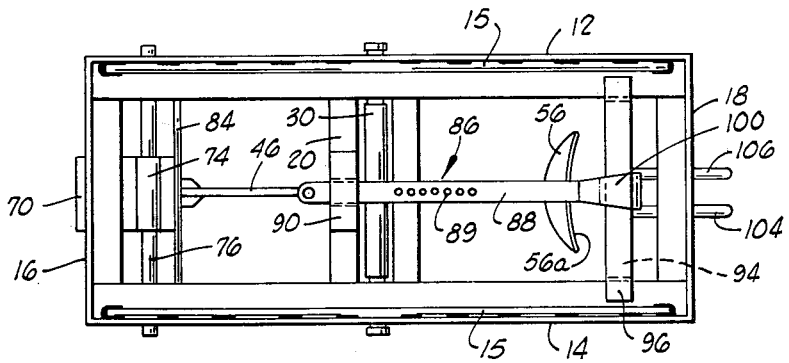
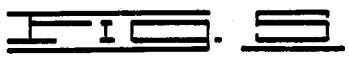
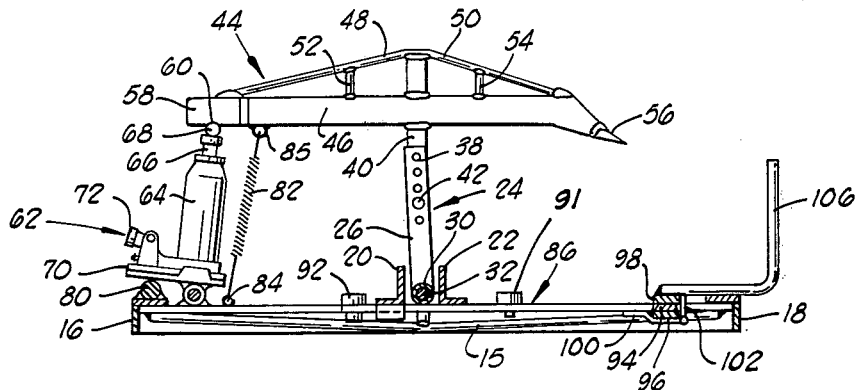
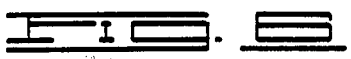
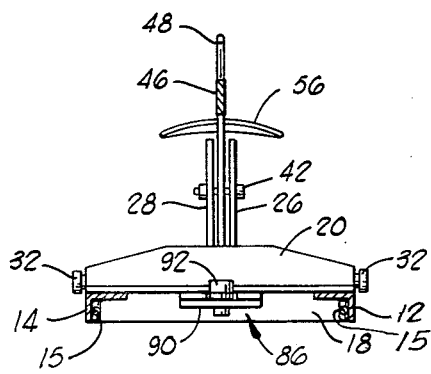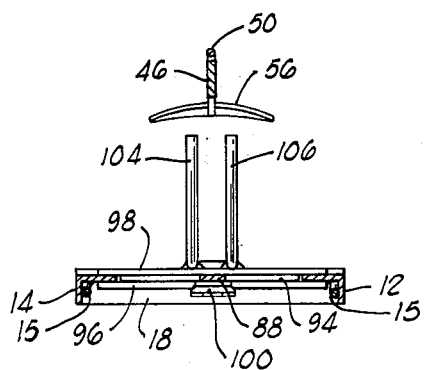
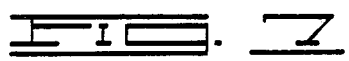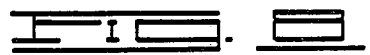

TIRE REMOVAL TOOL

BACKGROUND OF THE INVENTION

1. Field of the Invention

This invention relates to devices for multiplying force and applying it to the bead portion of a tire to break the tire away from a rim during repairing or replacement of the tire. More particularly, but not by way of limitation, the invention relates to an apparatus for removing a heavy, high inflation pressure truck tire from a steel rim upon which the tire is mounted in use.

2. Brief Description of the Prior Art

A number of types of tools and apparatus which afford mechanical advantage during the process of removal of a pneumatic tire from a steel wheel rim have been heretofore proposed. Many of these devices are simple in structure and rely upon basic mechanical principles, such as force multiplication through leverage, and constitute no more than a straight bar, or some modification thereof. These devices function well enough for relatively small pneumatic tires such as those used on automobiles, although even in these cases, the task of removal of the tire tends to be time consuming, to require some manual dexterity and to be physically exhausting.

With very large tires of the type used on trucks, the difficulty of removal of the tire from the rim is must greater. Frequently the bead of the tire has become frozen to the rim due to the high pressures utilized, and the task of breaking the bead away from the rim is extremely difficult. Also, in some instances, it is difficult to maintain the tire and the rim upon which it is mounted in a fixed position during the process of tire removal, and the physical capabilities of the person undertaking the removal of the tire are taxed.

Some very large hydraulic and pneumatic machines suitable for use in removing automobile tires from the rims have been developed and work well in practice. However, as a general proposition, these structures have not been extended to the problem of removing the tires from large truck wheel rims.

BRIEF DESCRIPTION OF THE PRESENT INVENTION

The present invention provides a tire removal tool which can be used to remove all types of tires from steel tire rims, but which is particularly well suited for removing heavy truck tires from such rims. The device is fairly simple in a mechanical sense and can be easily operated, and enables the tire to be removed quickly from the rim without danger to the person operating the tool, and with assurance that success will be attained.

Broadly described, the present invention comprises a horizontally extending base frame which can be rested upon the floor, an elongated lever larm spaced from the base frame, and an articulated fulcrum post structure of variable length which is pivotally supported on the base frame, and also pivotally supports, at its upper end, the elongated lever arm. The lever arm carries at one of its ends, a tire bead engaging plate shaped to conform geometrically to the tire bead of the tire to be removed from the rim. A hydraulic jack is pivotally supported on the base frame beneath the opposite end of the lever arm from that which carries the bead engaging plate, and such jack is mounted for both transverse sliding movement on the base frame in a direction normal to the longitudinal axis of the lever arm, and also for pivotal movement about a horizontal axis so that the upper end of the hydraulic jack is moved through an arc in a plane extending in coincidence with, or substantially parallel to, the longitudinal axis of the lever arm. A tire positioning slide assembly is slidably mounted on the base frame for sliding movement in a direction extending parallel to the longitudinal axis of the lever arm.

An important object of the present invention is to provide a hydraulically powered tire removal tool which can be used for removing heavy pneumatic truck tires from the steel rims upon which they are mounted.

A further object of the invention is to provide a relatively inexpensive and mechanically simple tire removal tool having high mechanical advantage and excellent registration characteristics (in terms of registration with the bead of the tire to be removed from a steel rim) whereby the tire removal tool can be used to develop the high forces applied at a precise location on the tire as necessary to remove heavy truck tires from the steel rims upon which they are mounted.

Another object of the invention is to provide a tire removal tool which is adaptable to alteration in its physical dimensions at several locations so that it can be used to most advantageously engage and remove the pneumatic tires from steel rims of widely varying sizes.

Additional objects and advantages of the invention will be apparent from the following detailed description of a preferred embodiment of the invention when such description is read in conjunction with the accompanying drawings which illustrate the invention.

GENERAL DESCRIPTION OF THE DRAWINGS

FIG. 1 is a side elevation view of the tire removal tool constructed in accordance with the present invention.

FIG. 2 is a plan view of the tire removal tool illustrated in FIG. 1.

FIG. 3 is an end view of the tire removal tool depicted in FIG. 1 as it appears when viewed from that end thereof upon which a wheel is placed preparatory to removing the tire therefrom.

FIG. 4 is an end view of the tire removal tool of the invention as it appears when viewed from the operator's end of the tool.

FIG. 5 is a bottom plan view of the tire removal tool of the invention as it appears when viewed from the lower side thereof.

FIG. 6 is a sectional view taken along line 6—6 of FIG. 2.

FIG. 7 is a sectional view taken along line 7—7 of FIG. 2.

FIG. 8 is a sectional view taken along line 8—8 of FIG. 2.

DETAILED DESCRIPTION OF A PREFERRED EMBODIMENT OF THE INVENTION

Referring initially to FIG. 1 of the drawings, the tire removal tool of the invention includes a base frame designated generally by reference numeral 10. The base frame is a generally rectangular structure and includes two substantially parallel, horizontally spaced side angle members 12 and 14. The opposite ends of the base frame 10 are formed by a pair of parallel end frame angle members 16 and 18. A pair of transverse angle stop members 20 and 22 are secured across the base frame 10 at the central portion thereof, and are spaced from each other for a purpose hereinafter described. It will be noted that the transverse angle stop members 20 and 22 have one flange thereof projecting vertically upwardly from the base frame 10.

Pivotally supported on the base frame 10 at a location between the angle stop members 20 and 22 is an articulated fulcrum post structure designated generally by reference numeral 24. The fulcrum post structure 24 includes a pair of horizontally spaced, vertically extending lower post members 26 and 28. The lower ends of the two lower post members 26 and 28 are secured by welding or other suitable means to a sleeve 30 which is pivotally supported on an elongated, transversely extending pivot pin 32. The pivot pin 32 is projected through supporting bushings 34 and 36 disposed at opposite sides of the frame on the longitudinal frame members 12 and 14, and between the transverse angle stop members 20 and 22.

It will be noted that each of the lower post members 26 and 28 has a plurality of spaced holes 38 formed in the upper end portion thereof. The articulated fulcrum post structure 24 further includes an upper post member 40 which projects downwardly between the two spaced lower post members 26 and 28 and is provided near its lower end with an aperture or hole (not visible) which can be aligned with a selected pair of holes 38 in the lower post members 26 and 28. A connecting pin 42 is then extended through the aligned holes to pivotally interconnect the upper post member 40 to the spaced lower post members 26 and 28.

Secured by welding or other suitable means to the upper end of the upper post member 40 is an elongated lever arm subassembly designated generally by reference numeral 44. The elongated lever arm subassembly 44 includes an elongated lever arm 46 which is provided with reinforcing struts 48 and 50 and interconnecting braces 52 and 54. At one of its ends, the elongated lever arm 46 is connected to an arcuately shaped tire wedge plate 56. It will be noted in referring to FIG. 2 that the tire wedge plate 56 includes a concave edge 56a which is formed on an arc of a circle, and such arc conforms to an arc of the circle defined by the outer edge of the steel rim upon which the tire to be removed therefrom is mounted.

At its end opposite that end upon which the tire wedge plate 56 is mounted, the elongated lever arm 46 is secured to a jack block 58. The jack block 58 is provided with a transversely extending groove 60 formed on the lower side thereof.

At one end of the base frame 10, a hydraulic jack subassembly, designated generally by reference numeral 62, is mounted upon the frame. The hydraulic jack subassembly 62 includes a conventional hydraulic jack having a cylinder 64 from which a piston rod 66 extends upwardly towards the elongated lever arm 46. At its upper end, the piston rod is secured to a transverse lifting bar 68 which is positioned to mate with and engage the transversely extending groove 60 in the lower side of the jack block 58. The type of hydraulic jack used is preferably of that previously known construction in which the overall length of the piston rod 66 can be varied by rotating a portion of the piston rod to screw out a telescoping part of the piston rod from an engaged portion thereof so as to lengthen the piston rod.

The base of the cylinder 64 is secured to a jack platform 70 which carries a standard or conventional jacking socket 72 which can be engaged by any suitable bar inserted therein and used for actuating the jack to extend the piston rod 66 therefrom. At its lower side, the jack platform 70 is secured to a sleeve 74 which is mounted for longitudinal sliding movement as well as pivotal movement on a supporting shaft 76. The hydraulic jack can thus be rocked or pivoted upon the supporting shaft 76, and can also be slid longitudinally on the shaft in order to move the piston rod 66 and the lifting bar 68 carried thereby out from under the elongated lever arm 46.

On the opposite side of the jack platform 70 from that side thereof which is pivotally connected to the supporting shaft 76, the jack platform rests upon the upper side of a support bar 80 which is welded to the upper side of the end frame angle member 16. An elongated spring 82 has a lower end thereof connected to a transversely extending spring anchor bar 84 which is projected between the opposite sides of the base frame 10, and has its upper end connected to an eye 86 secured to the lower side of the elongated lever arm 46.

For the purpose of positioning a wheel from which the tire is to be removed at a selected position on the base frame 10 preparatory to such removal, and for retaining the wheel at that location during the tire removal, a wheel positioning subassembly, designated generally by reference numeral 86, is mounted on the base frame and is movable in a longitudinal direction thereon. The wheel positioning subassembly 86 includes an elongated sliding plate 88 which is extended through a sliding plate receiving bracket 90 secured to the lower side of the transverse angle stop member 20. Intermediate its length, the sliding plate 88 carries a plurality of longitudinally spaced holes or apertures 89 which are sized to receive a removable stop pin 91. At its end located on one side of the receiving bracket 90, the sliding plate 88 carries a stop element 92 which limits the distance that the sliding plate 88 can move through the receiving bracket 90.

At its opposite end, the sliding plate 88 is secured to a transversely extending guide plate 94 which is aligned with the horizontally extending flanges on the two side angle members 12 and 14. The guide plate 94 is sandwiched between a transverse bottom plate 96 and a transverse top plate 98 as best shown in FIGS. 6 and 8. The transverse top plate 98 slides on the upper side of the horizontally extending flanges of the side angle members 12 and 14 of the base frame 10, and the transverse bottom plate slides along the bottom surfaces of these horizontal flanges of the side angle members of the base frame.

As shown in FIGS. 2, 5 and 6, a hinge is provided in the wheel positioning subassembly 86 and includes a lower leaf 100 which is welded or otherwise suitably secured to the transverse bottom plate 96 and, after bending upwardly, to the lower side of the sliding plate 88. The other leaf 102 of the hinge extends from the pivot pin of the hinge at the forward edge of the transverse bottom plate 96 upwardly and is then bent through a right angle and extends across the top side of the transverse top plate 98 to which this leaf of the hinge is welded. Secured to the upper surface of the transverse top plate 98 at positions on opposite sides of the leaf 102 of the hinge where such leaf is secured to the top plate are a pair of wheel locating angle bars 104 and 106.

Operation

In the use of the tire removal tool of the invention, the tool can first be adjusted or manipulated to change its dimensions so as to accommodate a particular size of tire which is to be removed from a correspondingly sized steel rim. Several points of adjustment are provided in the removal tool. Thus, for large tires, the upper post member 40 may be disconnected from the lower post members 26 and 28 of the articulated fulcrum post structure 24, and moved upwardly or downwardly to realign the opening therethrough with an aligned selected pair of the openings 38 in the fulcrum posts 26 and 28. The pin 42 is then reextended through the aligned openings so that the effect of such adjustment is to selectively elevate the elongated lever arm 46 above the base frame 10. For larger tires, of course, it will be more desirable to have the lever arm elevated with respect to the base frame to a greater height than in the case of smaller tires.

A further adjustment which may sometimes be desirable is that which can be attained by adjustments made to the hydraulic jack subassembly 62. Thus, as previously pointed out, the piston rod 66 can be elongated or foreshortened on many types of conventional jacks now provided on the market, and this is the type of jack preferably used in the present invention. This is accomplished by sliding the hydraulic jack subassembly 62 along the supporting shaft 76 to a point where the lifting bar 68 clears the groove 60 provided in the jack block 58 at one end of the elongated lever arm 46.

Having adjusted the hydraulic jack subassembly 62 and the articulated fulcrum post structure 24 in the manner described to best fit and cooperate with the tire which is to be removed from its rim, the tire is then placed over the wheel locating angle bars 104 and 106 so that these angle bars project through, and cooperate with, the hole or opening through the center of the rim of the wheel. The bars are spaced sufficiently apart that very little play will be allowed to exist in the case of the majority of types of wheels.

After so positioning the tire over the wheel locating angle bars, the wheel positioning subassembly 86 is then actuated by sliding the wheel toward or away from the outer end of the lever arm 46 which carries the tire wedge plate 56. This is continued until this tire wedge plate, when lowered by action of the jack subassembly 62, will bear upon, and conform to, the arcuate inner periphery of the tire bead where the bead projects under the rim. The sliding movement of the wheel positioning subassembly 86 is achieved by pushing the tire so as to cause the sliding plate 88 to slide longitudinally on the base frame 10. During this sliding movement, the wheel positioning subassembly 86 is guided by the guidance action developed between the frame and the guide plate 94 and the transverse top plate 98 and transverse bottom plate 96 between which the guide plate 94 is sandwiched. Also, the elongated slide plate 88 slides longitudinally through the receiving bracket 90. At this time, the stop pin 91 adapted to be extended through one of the holes 89 in the sliding plate 88 has been removed.

Once the tire and rim have been properly positioned and are aligned in the manner described with the tire wedge plate 56, the pin 91 is dropped back into one of the holes 89 which is immediately adjacent the angle stop member 20 so that the sliding plate 88 cannot move further in a direction away from the jack subassembly 62. The stop pin 91 prevents movement of the elongated slide plate 88 away from the hydraulic jack subassembly 62 by coming into abutting contact with the horizontal flange of the angle stop member 20. The hydraulic jack subassembly 62 is then actuated in the conventional fashion by inserting a bar or rod into the jack socket 72 and jacking the jack so as to extend the piston rod 66. This causes the tire wedge plate 56 to be forced down upon the bead of the tire to break it away from the rim upon which it is mounted. At the same time, the force exerted on the tire in this fashion causes a canting movement of the wheel locating angle bars 104 and 106, which in turn causes a canting movement of the transverse top plate 98 as is allowed by its hinged connection through the hinge plates 102 and 100 to the transverse bottom plate 96, and to the sliding plate 88. This canting movement of the transverse top plate 98 causes it to bite into the flat upper surfaces of the horizontally spaced side angle members 12 and 14 in a braking action and assure that the wheel positioning subassembly 86 cannot slide or shift on the base frame 10.

Continued downward depression of the tire wedge plate 56 breaks the bead of the tire away from the rim. This is repeated several times as the tire and rim are rotated around the wheel locating angle bars 104 and 106. Thus, ultimately, the tire is completely removed from the rim with very little effort and very little physical manipulation required.

Although a preferred embodiment of the invention has been herein described in order to elucidate and explain the basic principles which underlie the invention, it will be understood that various changes of structure and operating principle can be tolerated, and in fact may on occasion be desirable, without departure from these basic principles underlying the invention. Changes and innovations of this type are therefore deemed to be circumscribed by the spirit and scope of the invention except as they may be necessarily limited by the appended claims or reasonable equivalents thereof.

What is claimed is:

1. A tire removal tool comprising:
   a horizontally extending base frame adapted to rest flatly and immovably on a floor or the like;
   an elongated lever arm spaced from the base frame and extending generally parallel with respect to the base frame;
   an articulated fulcrum post structure pivotally supporting the lever arm on the base frame and including at least one lower post member pivotally connected to the base frame for pivotation about a horizontal axis at the level of the base frame, and an upper post member having a lower end pivotally connected to said lower post member for pivotation about a horizontal axis spaced upwardly from the point of pivotal connection of the lower post member to the base frame, and having an upper end connected to said elongated lever arm at a location spaced upwardly from said last-mentioned horizontal axis of pivotation;
   an arcuate tire bead engaging plate on one end of said lever arm;
   a hydraulic jack pivotally supported on the base frame beneath the opposite end of the lever arm from that which carries said bead engaging plates for pivotation about a horizontal axis, said hydraulic jack being positionable on the base frame relative to said lever arm for contacting at its upper end, the lower side of the end of said elongated lever arm opposite the end carrying said bead engaging plate; and
   a wheel positioning subassembly slidably mounted on said base frame for horizontal sliding movement thereon, said subassembly including means for automatically engaging said horizontally extending base frame and arresting said wheel positioning subassembly at a fixed location on said base frame when said lever arm is pivoted to force said arcuate tire bead plate against the bead of a tire positioned beneath said lever arm and tire bead engaging plate by said wheel positioning subassembly.

2. A tire removal tool as defined in claim 1 wherein said wheel positioning subassembly comprises:
   an elongated sliding plate slidably mounted on the frame for sliding in a direction parallel to the longitudinal axis of said elongated lever arm;
   a pair of wheel locating angle bars connected to said sliding plate and projecting upwardly from said base frame; and
   said means for automatically engaging said base frame is connected to said sliding plate and cooperates with said base frame for automatically arresting the sliding movement of the sliding plate on the base frame during the removal of a tire from a wheel rim using said tire removal tool.

3. A tire removal tool as defined in claim 1 wherein said lower post member is one of a pair of horizontally spaced, vertically extending lower post members each having a plurality of spaced apertures therein, and wherein said articulated fulcrum post structure further comprises:
   means pivotally supporting each of said lower post members on said base frame for pivotation about said firstmentioned horizontal axis;
   and wherein said upper post member secured to said elongated lever arm projects downwardly between said lower post members; and
   means pivotally interconnecting the upper post member to said lower post members.

4. A tire removal tool comprising:
   a horizontally extending base frame;
   an elongated lever arm spaced from the base frame and extending generally parallel with respect to the base frame;
   an articulated fulcrum post structure pivotally supporting the lever arm on the base frame and including at least one lower post member pivotally connected to the base frame for pivotation about a horizontal axis, and an upper post member having a lower end pivotally connected to said lower post member for pivotation about a horizontal axis spaced from the point of pivotal connection of the lower post member to the base frame, and having an upper end connected to said elongated lever arm;
   an arcuate tire bead engaging plate on one end of said lever arm;
   a jack platform having an upper side;
   a sleeve secured to said jack platform;
   a supporting shaft secured to said base frame and projecting through said sleeve to pivotally support said sleeve and said jack platform for pivotation about a horizontal axis and for sliding movement transversely of said base frame, and between positions vertically aligned with said elongated lever arm and transversely offset from said elongated lever arm; and
   a hydraulic jack supported on said jack platform for pivotation therewith and positionable beneath the opposite end of the lever arm from that which carries said bead engaging plate, said hydraulic jack being positionable on the base frame and relative to said lever arm for contacting at its upper end, the lower side of the end of said elongated lever arm opposite the end carrying said bead engaging plate; and
   a wheel positioning subassembly slidably mounted on said base frame for horizontal sliding movement thereon.

5. A tire removal tool comprising:
   a horizontally extending base frame;
   an elongated lever arm spaced from the base frame and extending generally parallel with respect to the base frame;
   an articulated fulcrum post structure pivotally supporting the lever arm on the base frame and including at least one lower post member pivotally connected to the base frame for pivotation about a horizontal axis, and an upper post member having a lower end pivotally connected to said lower post member for pivotation about a horizontal axis spaced upwardly from the point of pivotal connection of the lower post member to the base frame, and having an upper end connected to said elongated lever arm;
   an arcuate tire bead engaging plate on one end of said lever arm;
   a hydraulic jack pivotally supported on the base frame beneath the opposite end of the lever arm from that which carries said bead engaging plate for pivotation about a horizontal axis, said hydraulic jack being positionable on the base frame and relative to said lever arm for contacting at its upper end, the lower side of the end of said elongated lever arm opposite the end carrying said bead engaging plate; and
   a wheel positioning subassembly slidably mounted on said base frame for horizontal sliding movement thereon, said wheel positioning subassembly comprising:
   an elongated sliding plate slidably mounted on the base frame for sliding in a direction parallel to the longitudinal axis of said elongated lever arm;
   a pair of wheel locating angle bars connected to said sliding plate and projecting upwardly from said base frame;
   a guide plate secured to one end of said elongated sliding plate and positioned to guide on said base frame during the sliding movement of said sliding plate on said base frame; and
   transverse plate means extending across said base frame and movably connected to said guide plate and sliding plate for braking engagement with said base frame when said wheel locating angle bars are pivoted about horizontal axes.

6. A tire removal tool as defined in claim 5 wherein said articulated fulcrum post structure is further characterized as including:
   a pair of horizontally spaced, vertically extending lower post members each having a plurality of spaced apertures therein;
   means pivotally supporting each of said lower post members on said base frame for pivotation about said first-mentioned horizontal axis;
   and wherein said upper post member secured to said elongated lever arm projects downwardly between said lower post members; and
   means pivotally interconnecting the upper post member to said lower post members.

7. A tire removal tool as defined in claim 5 and further characterized as including:
  a jack platform having an upper side and supporting said hydraulic jack on the upper side thereof;
  a sleeve secured to said jack platform; and
  a supporting shaft secured to said base frame and projecting through said sleeve to pivotally support said sleeve for pivotation about a horizontal axis.

8. A tire removal tool as defined in claim 6 and further characterized as including:
  a jack platform having an upper side and supporting said hydraulic jack on the upper side thereof;
  a sleeve secured to said jack platform; and
  a supporting shaft secured to said base frame and projecting through said sleeve to pivotally support said sleeve for pivotation about a horizontal axis.

9. A tire removal tool as defined in claim 8 wherein said transverse plate means comprises:
  a transverse bottom plate extending across the lower side of said frame and aligned with said guide plate and secured to said sliding plate; and
  a transverse top plate extending across the upper side of said frame and aligned with said guide plate;
  and wherein said arresting means further includes a hinge having a first leaf secured to said transverse bottom plate and having a second leaf secured to said transverse top plate.

10. A tire removal tool as defined in claim 9 wherein said means pivotally supporting said lower post members on said base frame comprises:
  a pivot pin secured across the upper side of said frame; and
  a sleeve secured to said lower post members and pivotally mounted around said pivot pin.

11. A tire removal tool for removing large truck tires from the rims thereof, comprising:
  a horizontally extending base frame;
  a fulcrum post structure projecting upwardly from a central portion of the base frame;
  an elongated lever arm connected to a point between the ends thereof to the upper end of said fulcrum post structure;
  means at one end of the lever arm for engaging and pushing an arcuate segment of a tire bead off a tire rim;
  a hydraulic jack slidably and pivotably mounted on said base frame at one end thereof and movable from a position of engagement with the opposite end of said lever arm from said engaging and pushing means, to positions on said frame laterally out of line with said lever arm, and vertically out of line with said lever arm; and
  a wheel positioning subassembly slidably mounted on the under side of said base frame and reciprocable thereon in a direction parallel to said lever arm, said wheel positioning means including wheel engaging means insertable through the opening in the center of the tire rim.

12. A tire removal tool as defined in claim 11 wherein said fulcrum post structure is selectively adjustable in its length of extension upwardly from said base frame whereby the distance at which said lever arm is disposed above said base frame is selectively adjustable.

13. A tire removal tool as defined in claim 11 further characterized as including spring means connected between said base frame and said lever arm for biasing said lever arm into engagement with said hydraulic jack when said jack is in said first-mentioned position.

14. A tire removal tool as defined in claim 11 wherein said wheel engaging means includes at least one wheel locating angle bar mounted in said wheel positioning subassembly for limited movement about a horizontal axis relative to said base frame.

* * * * *